(12) United States Patent
Scaglione et al.

(10) Patent No.: US 7,929,411 B2
(45) Date of Patent: Apr. 19, 2011

(54) METHODS AND SYSTEMS FOR OBTAINING DATA FROM NETWORKS OF SOURCES

(75) Inventors: Anna Scaglione, Ithaca, NY (US); Yao-Win Hong, Kaohsiung (TW); Pramod K. Varshney, Fayetteville, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 1183 days.

(21) Appl. No.: 11/529,084

(22) Filed: Sep. 28, 2006

(65) Prior Publication Data

US 2007/0071146 A1 Mar. 29, 2007

Related U.S. Application Data

(60) Provisional application No. 60/721,314, filed on Sep. 28, 2005.

(51) Int. Cl.
*H04J 11/00* (2006.01)
(52) U.S. Cl. .................. 370/208; 370/203; 370/270
(58) Field of Classification Search ................ 370/335
See application file for complete search history.

(56) References Cited

U.S. PATENT DOCUMENTS

| 7,242,294 B2* | 7/2007 | Warrior et al. ........... 340/539.22 |
| 2004/0034581 A1* | 2/2004 | Hill et al. ........................ 705/28 |
| 2006/0195201 A1* | 8/2006 | Nauck et al. ..................... 700/30 |

OTHER PUBLICATIONS

Wolf, J. K. "Born Again Group Testing: Multiaccess Communications." IEEE Transactions on Information Theory, IT31(2) Mar. 1985, pp. 185-191.
Berger, T. et al. "Random Multiple-Access Communication and Group Testing." IEEE Transactions on Communications, COM-32(7) Jul. 1984, pp. 769-779.
Swaszek, P. et al. "Parley as an Approach to Distributed Detection." IEEE Transactions on Aerospace and Electronic Systems, 31(1) Jan. 1995, pp. 447-457.
Ammar, M. H. et al. "On the Performance of Protocols for Collecting Responses over a Multiple-Access Channel." IEEE Transactions on Communications, 43(2/3/4) Feb./Mar./Apr. 1995, pp. 412-420.
Garg, N. K. et al. "Group Testing Protocol with Capture for Random Access Communication." IEEE Transactions on Communications, COM-35(8) Aug. 1987, pp. 849-854.
U.S. Appl. No. 60/721,314, filed Sep. 28, 2005. "Methods and Systems for Obtaining Data from Networks of Sources." Scaglione et al.

* cited by examiner

*Primary Examiner* — Patrick N Edouard
*Assistant Examiner* — Jalaleddin Amirmokri
(74) *Attorney, Agent, or Firm* — Burns & Levinson, LLP; Orlando Lopez (57) ABSTRACT

Methods and systems for obtaining data from a number of distributed sources.

18 Claims, 9 Drawing Sheets

Group Queries

FIG. 1a

Cooperative Response

Non-Cooperative

FIG. 11a

Cooperative

METHODS AND SYSTEMS FOR OBTAINING DATA FROM NETWORKS OF SOURCES

CROSS REFERENCE TO RELATED APPLICATIONS

This application claims priority of U.S. Provisional Application 60/721,314, "Methods And Systems For Obtaining Data From Networks Of Sources," filed on Sep. 28, 2005, which is incorporated by reference herein.

STATEMENT OF GOVERNMENT INTEREST

This invention was made partially with U.S. Government support from the National Science Foundation under grant CCR-0431077. The U.S. Government has certain rights in the invention.

BACKGROUND

The problem of efficiently retrieving correlated information from a large number of distributed sources appears in many areas of engineering, such as querying from a distributed database, content-delivery in peer-to-peer networks or the exchange of local information in a sensor network.

In the literature, most of the work on the data distribution problem proposes strategies for either the source coding or the channel coding aspects while enforcing a separation between the two functionalities. It has been shown by Gupta and Kumar that, without considering the transmission content, peer-to-peer packet transmission among arbitrarily chosen transmitter/receiver pairs in the wireless networking scenario leads to a per node throughput that vanishes as $O(1/\sqrt{N})$, where N is the number of nodes in the network. This scaling law may not be as important in sensor applications, since it is often necessary for the distributed sensors to convey their local information to a central processor, which leads to the so called many-to-one network.

Unfortunately, the many-to-one network topology can leads to even more restrictive scaling laws on the per node throughput, such as the $O(1/N)$ scaling performance derived in (or the $O(\log N/N)$ by utilizing antenna sharing schemes). This is caused by the bottleneck effect that occurs at the last hop towards the data-gathering node. Relying on the assumption that sensors' observations are increasingly correlated when the density of sensors increases, many authors proposed the use of distributed source coding (DSC) techniques based on the Slepian-Wolf encoding for discrete data or Wyner-Ziv encoding for continuous data, to reduce the aggregate information rate produced by the nodes in a sensor network. Capitalizing on the high data correlation, it has been shown that the cross-layered optimization of the source coding and transmission scheduling strategies (or cooperative transmission schemes) can achieve good scaling performances for a large class of sensor data models where the aggregate information rate increases slower than the network capacity. Unfortunately, the methodologies used to prove these results do not scale well in terms of complexity or latency, which is primarily caused by the need of encoding over long temporal sequences and by the strict sequential decoding structure. Although suboptimal solutions are available, the cross-layer optimization of the information flow through the network is a complex problem that is left unsolved. Even if they are discussed at all, the required transmitter and receiver protocols are often of high complexity and not suitable to be generalized and applied to a random network.

In the multiple access application, group testing was proposed as an efficient solution for random access scheduling in packet networks. In this case, the information that is resolved through group testing is the presence or absence of a message within the transmission queue of each node. In the framework of these publications, the probability of a certain node having a message to transmit is independent and identical from node to node, therefore, the entire network state can be modeled as a sequence of i.i.d. (independent identically distributed) Bernoulli random variables with probability p of having a message to transmit, much like the modeling of the blood testing problem. In sensor networks, an analogous model could arise when unexpected independent events trigger alarms in isolated sensors. Since the outcome of each test belongs to a binary alphabet, an obvious lower bound for the number of tests is represented by the joint entropy of the Bernoulli i.i.d. (independent identically distributed) field $H(X)=NH(p)$. In the work mentioned above, the group testing strategy was applied only to multiple access scheduling.

There is a need for methods and systems for obtaining data from the sources such as sensor networks. There is also a need for methods and systems for obtaining data from the sources such as sensor networks which correspond to more general data models than the Bernoulli i.i.d. data model.

BRIEF SUMMARY

In one embodiment, the method of these teachings for obtaining data from a number of distributed sources (distributed sources as used herein includes both sensors communicating to a central receiver and cooperative transmission by distributed sensors as well as other distributed sources) includes steps of:
  (a) selecting a group of the distributed sources,
  (b) receiving, at a receiving node, transmission from the selected group of the distributed sources,
  (c) performing a predetermined processing on the data received at the receiving node,
  (d) obtaining, from the predetermined processing, an estimate or an inference on the data from the number of distributed sources,
  (e) repeating steps (a) through (d), if the estimate or inference does not satisfy a predetermined criterion,
  (f) selecting the estimate or inference, if the estimate or inference satisfies the predetermined criterion.

In another embodiment, the method of these teachings for obtaining data from a number of distributed sources includes steps of:
  (a) Selecting a transmission action or test that includes:
    i. selecting a group of the distributed sources,
    ii. selecting a coding rule applied by each member in the group. The coding rule is based on the node local data and possibly on the current step of the algorithm
  (b) receiving, at a receiving node, the transmitted codes from the selected group of the distributed sources
    i. The codes can be received individually or in a combined form due to the presence of a Multiple Access Channel between the receiver and the group of nodes. The type of channel affects the design of the coding rule.
  (c) performing a predetermined processing on the data received at the receiving node using the codes acquired in this action/test and in the previous steps. The processing provides:

(d) an estimate or an inference on the data that the sensors have. If the estimate or inference meets the predetermined criterion of performance set for the algorithm, the procedure stops otherwise (e) if the estimated data does not satisfy a predetermined criterion, repeating steps (a) through (d), wherein the estimated data is substantially the data from the number of distributed sources if the predetermined criterion is met.

This methodology can offer an advantage over polling each sensor individually. The advantage is obtained by incorporating good initial guesses of the state of the group of sensor nodes into the tests. A good set of guesses will lead to a short set of queries on the average.

Embodiments with application to sensor fusion and embodiments that combine the number of channel accesses and compression are also disclosed.

Systems that implement the method of these teachings are also disclosed.

For a better understanding of the present teachings, reference is made to the accompanying drawings and detailed description and its scope will be pointed out in the appended claims.

BRIEF DESCRIPTION OF THE DRAWINGS

FIGS. 10a and 10b are schematic graphical representation of the output (response) from sensor networks of these teachings for the field of FIG. 9a;

DETAILED DESCRIPTION

In one embodiment, the method of these teachings for obtaining data from a number of distributed sources includes steps of:

(a) selecting a group of the distributed sources, (b) receiving, at a receiving node, transmission from the selected group of the distributed sources, (c) performing a predetermined processing on the data received at the receiving node, (d) obtaining, from the predetermined processing, an estimate or an inference on the data from the number of distributed sources, (e) repeating steps (a) through (d), if the estimate or inference does not satisfy a predetermined criterion, (f) selecting the estimate or inference, if the estimate or inference satisfies the predetermined criterion.

In another embodiment, the method of these teachings for obtaining data from a number of distributed sources includes steps of:

(a) Selecting a transmission action or test that includes:

(a1) selecting a group of the distributed sources,(a2) selecting a coding rule applied by each member in the group. The coding rule is based on the node local data and possibly on the current step of the algorithm, (b) receiving, at a receiving node, the transmitted codes from the selected group of the distributed sources. The codes can be received individually or in a combined form due to the presence of a Multiple Access Channel between the receiver and the group of nodes. The type of channel affects the design of the coding rule.

(c) performing a predetermined processing on the data received at the receiving node using the codes acquired in this action/test and in the previous steps. The processing provides:

(d) an estimate or an inference on the data that the sensors have. If the estimate or inference meets the predetermined criterion of performance set for the algorithm, the procedure stops otherwise if the estimated data does not satisfy a predetermined criterion, repeating steps (a) through (d), wherein the estimated data is substantially the data from the number of distributed sources if the predetermined criterion is met.

Figure 1A:
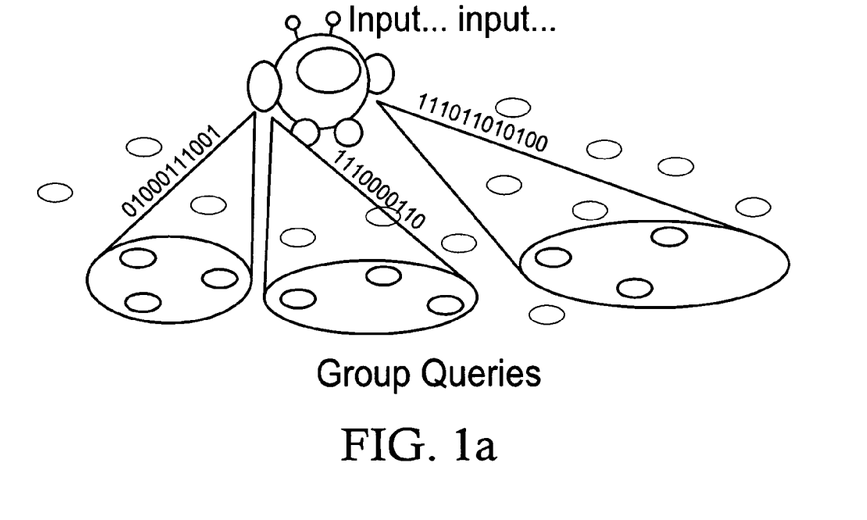
FIGS. 1a, 1b are schematic graphical representations of an embodiment of the system of these teachings.
Figure 1B:
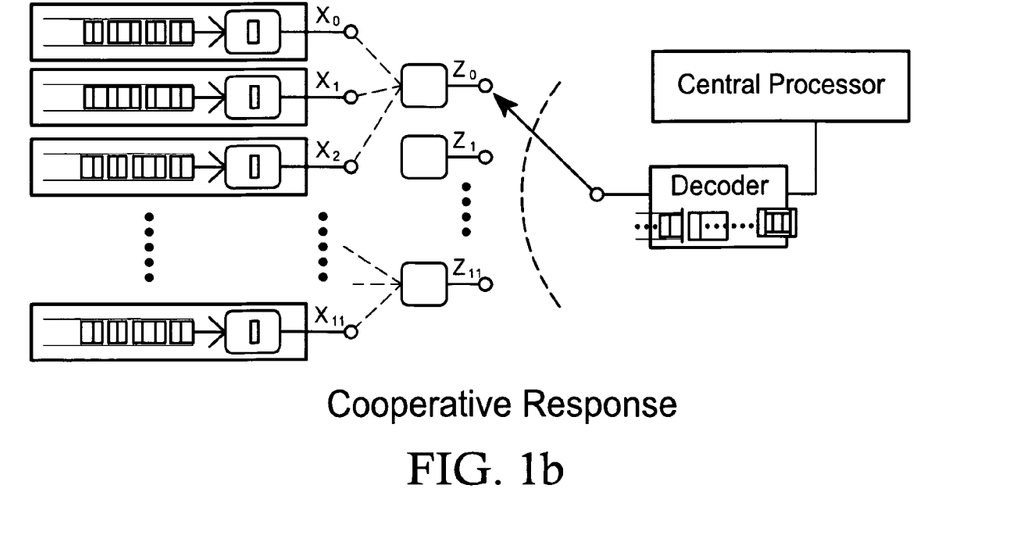

In one embodiment, the sources are sensors and a system on which the method is applied includes a set of N sensors $S=\{s_0, s_1, \ldots, s_{N-1}\}$ performing a sequence of observations $X=[X_0, X_1, \ldots, X_{N-1}]$ with the joint probability distribution $p_{x_0, \ldots, x_{N-1}}(x_0, \ldots, x_{N-1})$. In general, the observation $X_i$ of sensor $s_i$ belongs to the symbol alphabet $A_i$, where $A_i$ may be different for each sensor and the $X_i$'s may be correlated. An embodiment of the system utilizing the method of these teachings is shown in FIGS. 1a and 1b.

In one embodiment, the actions are tests (or queries) performed on the selected group of distributed sources. The group testing strategy is defined by the group testing tree (T,U,F), where T is the set of questions asked on each corresponding group (actions) determined in U, and F is the set of possible outcomes (or feedback) of the tests.

Figure 2:
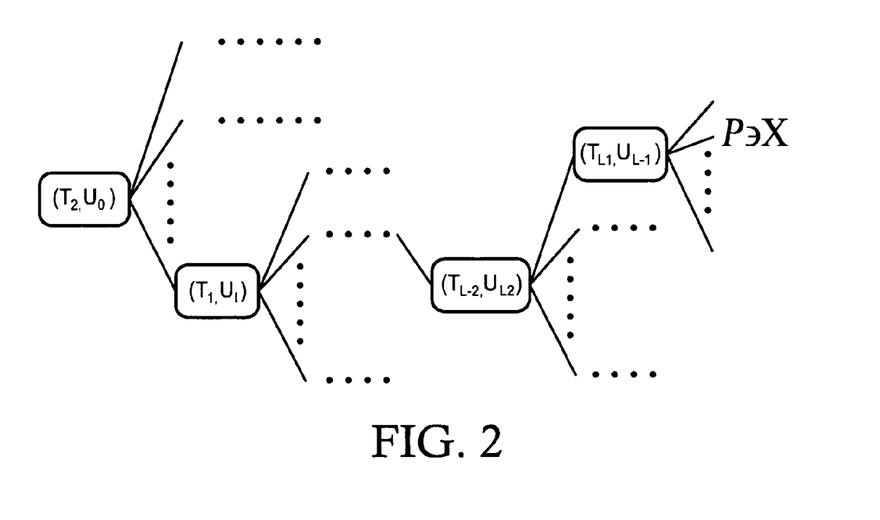
FIG. 2 is an embodiment of a testing strategy of these teachings.

An illustration of the group testing tree (T,U,F) is shown in FIG. 2. Each node in the tree represents a test $(T_1, U_1)$, where $T_1$ is the question that is imposed on sources (sensors) in group $U_1$, and each branch extending from the node represents a different feedback response where the feedback $Z_1$ belongs to the set $F_1 \in F$. The set of feedbacks $F_1$ is equivalent to the output alphabet of the feedback channel between the group of sensors $U_1$ and the receiver/receivers. Ideally, having access to each subsequent feedback allows the receiver to refine the observation space, $\Pi_i A_i$, into smaller and smaller subsets until the space is reduced to the set $P \subset \Pi_i A_i$ (as shown in FIG. 2) such that $X \in P$ and the estimate $\hat{X}$ is within the desired distortion.

In one instance, the mean square error criterion is utilized in defining the estimate of the data from the distributed sources.

In one embodiment, the predetermined criterion comprises obtaining a distortion measure from the estimated data and determining whether the distortion measure is less than or equal to a predetermined distortion constraint.

One embodiment of the testing strategy is the binary tree splitting test strategy, which is described below. The binary tree splitting strategy can be generalized as a location based tree splitting or for an m-ary response alphabet.

The binary tree splitting protocol initially splits the group of sensors (sources) into two subgroups of equal size. Similar to the previous strategy, each of these subgroups are tested with the questions and feedbacks restricted to the classes $T_0 \times T_1$ and $F_0 \times F_1$ described by Du and Hwang (Ding-Zhu Du and Frank K. Hwang, *Combinatorial Group Testing and Applications*, vol. 12 of *Series on Applied Mathematics*, World Scientific Pub Co Inc., 2 edition, October 1993). If the outcome of the test results in an erasure (an erasure being when both tested subgroups return an outcome of 1), the original group is divided again into two subgroups of the same size where each subgroup is tested separately in the subsequent time slots. The binary splitting process continues until a 0 or 1 is received. In this case, the smallest group that is not yet resolved is tested in the following time slot.

Figure 3:
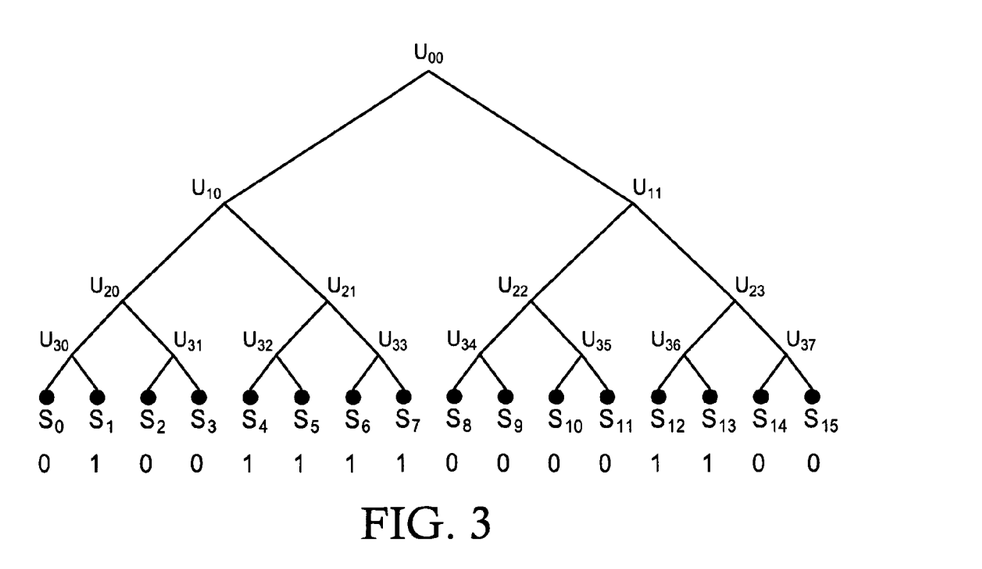
FIG. 3 is another embodiment of a testing strategy of these teachings.

As an exemplary embodiment, consider a network of 16 nodes, as shown in FIG. 3. Let each vertex $U_{ij}$ denote a group that consists of sensors within its subtree. In the proposed algorithm, the sequence of tests starts from the subgroups of $U_{00}$, i.e. $U_{10}$ and $U_{11}$, and continues splitting and testing the smaller subgroups each time the larger group cannot be resolved through a single test. If the test on $Uij$ results in either 0 or 1, the system continues on testing the group $U_{i,j+1}$ since it is the smallest group that is not yet resolved. However, if the test results in an erasure, the vertex $U_{ij}$ branches into two subgroups where the group $U_{i+1, 2j}$ is tested next.

Figure 4:
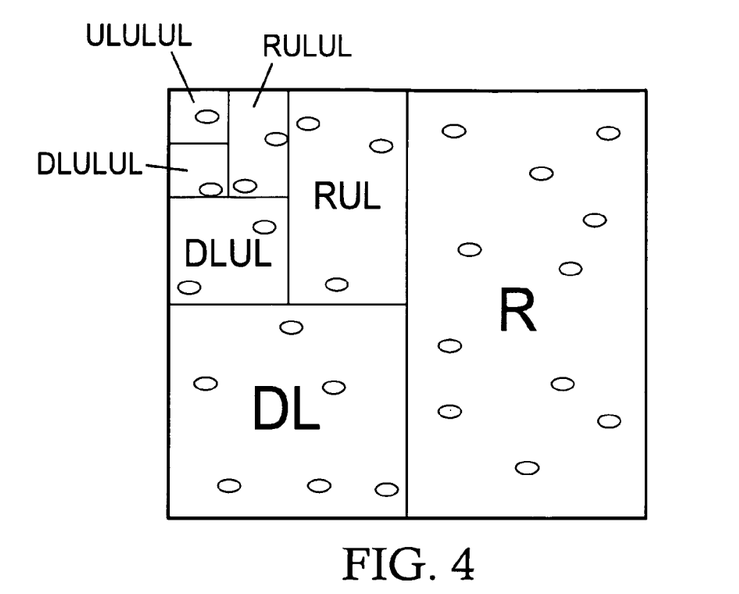
FIG. 4 is a further embodiment of a testing strategy of these teachings.

In another embodiment of the binary test strategy, the strategy is equally applicable to cases where the groups are split into subgroups of unequal size. In practice, the splitting of groups can be performed according to the location of the sensors. More specifically, let the set of sensors S be randomly distributed within the d×d square area and let the sensors be grouped in the order shown in FIG. 4. When the initial group S results in an erasure, the network is first split into the (L)eft and (R)ight groups according to their locations by equally partitioning the square area. If the testing of group L results in an erasure, the L group is split into the (U)p-L group and (D)own-L group and test each of them individually in the subsequent periods. However, if the feedback is either 0 or 1, we proceed on testing the next smallest group that is not yet resolved which is R in this case. Assuming that the feedbacks continue to be erasures, we proceed on splitting the nodes, as shown in FIG. 4, into the Left of UL and Right of UL, then Up of LUL and Down of LUL . . . etc. In this algorithm, it is sufficient for each sensor to know its own location and not the location of others.

Figure 5:
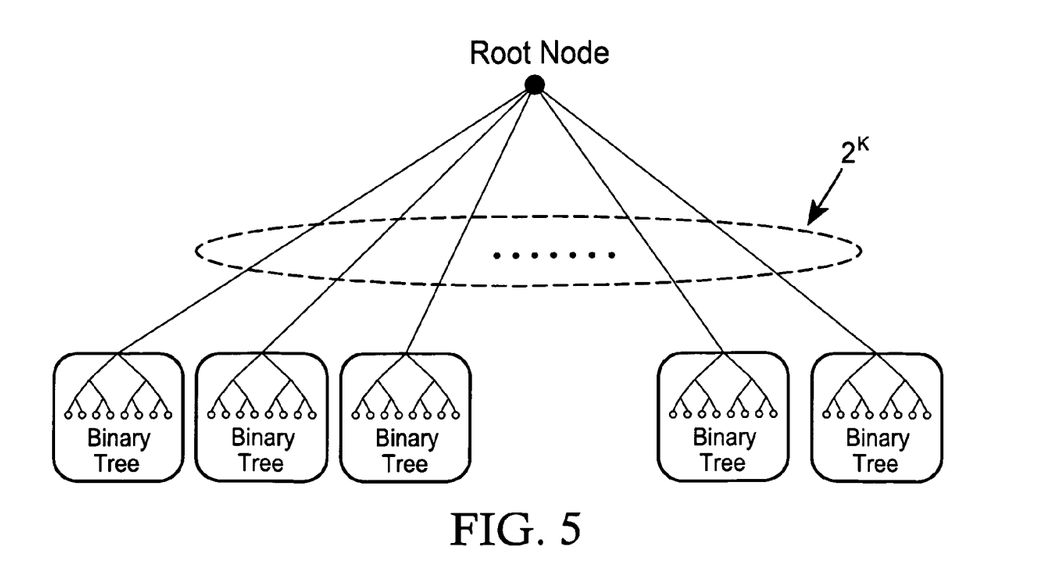
FIG. 5 is a schematic graphical representation of an embodiment of a network as obtained from the method of these teachings.

Based on the structure of the tree splitting algorithm, one can improve upon the original scheme by optimizing over the initial partitioning of the network during the first test. In the binary tree splitting algorithm disclosed above, the process is initiated by splitting the network into 2 subgroups and then proceeding with the binary splitting within each group. In this case, the testing process initiates from large groups of sensors where the outcome is likely to result in an erasure if the sensors are less correlated. In a further embodiment, the number of initial partitioning is optimized such that the network is split directly into $2_K$ subgroups, where $K \geq 1$ is optimally chosen. The binary tree splitting algorithm proceeds in each of the initial partitions. In this embodiment, the initial group size is adjusted according to the sensor statistics, thus, avoiding the unnecessary testing that may result from cases where the sensors are less correlated. Then, the optimal K that minimizes the expected number of tests E{L} for each value of (p, p) is found. Details of the optimization are given in Hong Y. W., Scaglione A. "On Multiple Access for Correlated Sources: A Content-Based Group Testing Approach", Appendix I of U.S. Provisional Application 60/721,314, which is incorporated by reference herein. (See also FIG. 5)

In spite of its simple structure, it should be noted that, in the binary tree splitting algorithm, the operation does not depend on the statistics of the underlying sensor field. Therefore, it is applicable to all cases independent of the probability model. In fact, in most sensor applications (where the data sources are sensors) where the statistics of the sensor field are not available beforehand, one can utilize the data driven property of the binary tree splitting scheme to efficiently retrieve data from sensor field while estimating the desired statistics on the fly. The estimated statistics can then be used to choose the optimal splitting of the initial group. This results in an adaptive strategy to efficiently retrieve distributed data without the initial knowledge of the sensor field statistics.

In yet another embodiment, the m-ary group testing strategy, the binary tree splitting algorithm disclosed above is generalized by increasing the number of questions asked (actions) during each test. For binary sources, the questions are restricted to the class $T_0 \times T_1$, while the feedback informs the receiver with the 0, 1, e information. In the case of m-ary alphabets, the questions are restricted to the extended class $\Pi_{c \in C} T_c$ and extend the feedback (responses) set to $\Pi_{c \in C} F_c$.

Figure 6:
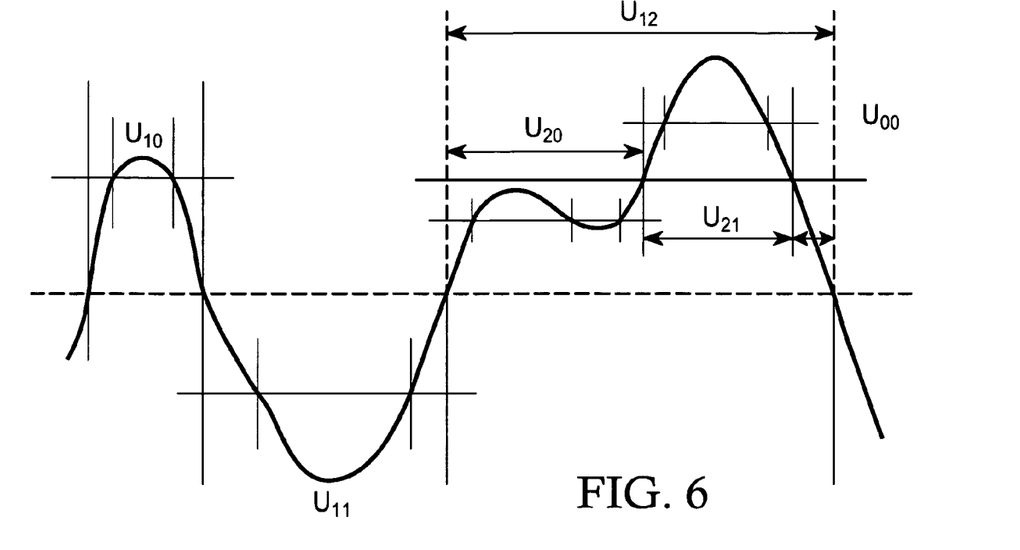
FIG. 6 is another embodiment of a testing strategy of these teachings.

In deriving the group testing strategy for the m-ary case, an alternative approach can be taken where the m-ary message is considered as a sequence of binary alphabets $Xi=[x_{i0}, x_{i1}, \ldots, x_{i,b-1}]$ where $b=[\log_2 m]$. The first bit $x_{i0}$ represents the most significant bit (MSB) that quantizes the samples into two levels. The second bit represents the quantization of the samples within each level indicated by $x_{i0}$. Proceeding in this manner, the bits represent the quantization in the order of their significance as shown in FIG. 6. With high sensor correlation, we shall expect large sets of close-by sensors to observe identical symbols at the most significant bit ($b_0$), such as the groups $U_{10}$, $U_{11}$ and $U_{12}$ shown in FIG. 6. The sensors within each contiguous group are again partitioned by the next significant bit also into contiguous sets. Continuing in this fashion, one can efficiently resolve the sensor's observations by iteratively imposing the binary group testing methodology on each partitioned group. This results in a nested testing procedure, where the level of nesting depends on the significance of each bit.

When the observations are correlated, a central processor is able to gain partial knowledge of the untested sensors through the tests on other subsets of the network. Consequently, one can adjust the group testing strategy by incorporating the joint statistics of the distributed observations. For example, in the case where sensors are highly correlated, a set of m sensors tested to have the observation c∈A may imply that the whole network of sensors observed c with high probability. More generally, except for the case where sensors have identical observations, it is possible that a particular pattern among sensors occurs with high probability. This case is not accounted for in the classical group testing formulation. Furthermore, in sensor applications, the set of admissible tests are increased compared to the classical scenario since the intelligence of the sensors are capable of answering a larger class of questions T. The feedback F can also be improved by incorporating advanced physical layer designs such as using multiple thresholds at the detector to detect multiple defects in a group.

Although the above-described embodiments of the method of these teachings relate to one central receiver, the method of these teachings also applies to distributed sensor networks and transmission method such as that described in U.S. patent application Ser. No. 10/946,439, which is incorporated by reference herein. In those embodiments, each distributed source (sensor) in the network acts also as a receiver and collects all the data exactly as the central collector would in the embodiment described before. The use of this decentralized method requires broadcast communication capability among the nodes. The method of these teachings includes the following additional steps (shown together with the steps previously described):

(a) Selecting a transmission action or test that includes:
  (a1) selecting a group of the distributed sources, (a2) selecting a coding rule applied by each member in the group. The coding rule is based on the node local data and possibly on the current step of the algorithm
(b) receiving, at a receiving node, the transmitted codes from the selected group of the distributed sources. The codes can be received individually or in a combined form due to the presence of a Multiple Access Channel between the receiver and the group of nodes. The type of channel affects the design of the coding rule. (b1) Repeat (b) for every node in the network.
(c) performing a predetermined processing on the data received at the receiving node using the codes acquired in this action/test and in the previous steps. (c1) Perform (c) for every node in the network. The processing provides each node with:
(d) an estimate or an inference on the data that all the sensors have. If the estimate or inference meets the predetermined criterion of performance set for the algorithm, the procedure stops otherwise
(e) if the estimated data does not satisfy a predetermined criterion, repeating steps (a) through (d), wherein the estimated data is substantially the data from the number of distributed sources if the predetermined criterion is met.

Figure 7:
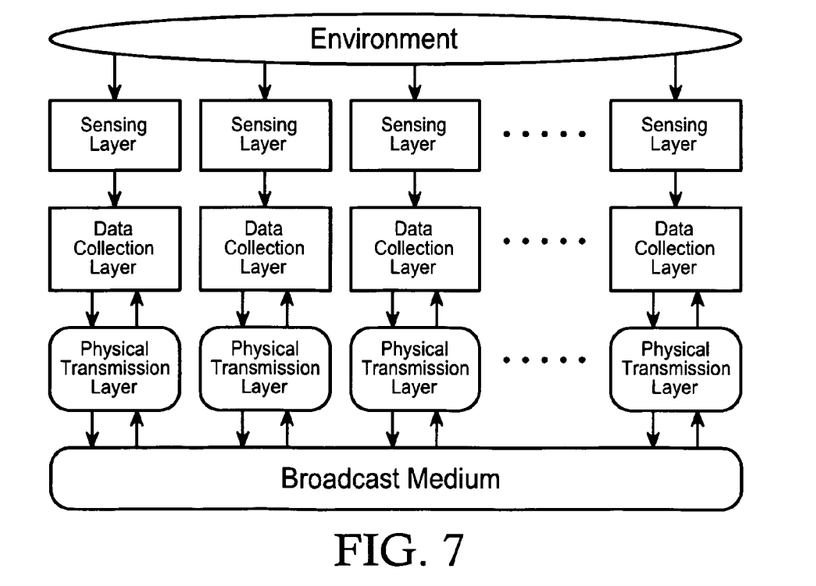
FIG. 7 is another schematic graphical representation of an embodiment of the system of these teachings.

An embodiment of a system of these teachings capable of practicing the above-described method is shown in FIG. 7.

FIG. 7 depicts an architecture for systems of these teachings. Each tested group of sensors is allocated a distinct transmission period in which they convey their collective feedback (see FIG. 8). By ensuring a reliable distribution of the feedback, each sensors will be able to reconstruct the entire sequence of observations. The method of these teachings defines an architecture specifically tailored to sensor networks, which includes the sensing layer, data collection layer and physical transmission layer as shown in FIG. 7. In fact, the method of these teachings has exclusive exchanges of control information from the data collection functionality and feedback information from the physical layer functionality.

In one embodiment, the sensors operate under a slotted system and the nodes are synchronized to the transmission slots. The testing of sensors in group testing terminology is equivalent to assigning a transmission time slot to the specified group of sensors. Within the allocated time slot, the sensors cooperatively transmit a collective feedback information to the receiver node. The receivers then process the next tested group by visiting the nodes in the group testing tree (T,U,F) through the route determined by the feedbacks.

The feedback property of the group testing protocol enables a system architecture that extends from the centralized scenario to a completely distributed scenario.

In the centralized application, the feedback is received only at the central processor. In this case, each sensor acts only as a dummy receiver where the group testing protocol is only programmed at the central node, as detailed in the first described embodiment of the method of these teachings.

On the opposite end, the group testing protocol can be implicitly implemented at each individual sensor and the feedback can be distributed to all sensors using any form of network broadcast. The knowledge of the sequence of feedbacks leads each sensor down the correct testing path within the tree (T,U,F) and determines whether or not the sensor is scheduled to transmit in the present time slot. This flexibility in the system design is a major advantage of group testing since it enables a totally distributed design.

Figure 8:
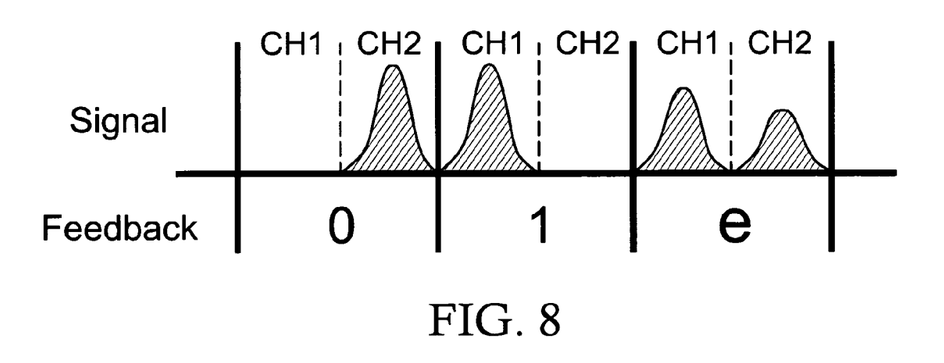
FIG. 8 is schematic graphical representation of the responses from a system of these teachings.

The embodiments of the system of these teachings described below include a simple implementation of an OR channel. In the simple implementation, the sensors act as simple pulse transmission devices and assume that the receiver acquires the feedback by simply using an energy detector. During each transmission time slot, two orthogonal channels are allocated to the transmission of each sensor within the tested group. The questions in the class $T_0 \times T_1$, are imposed upon the group. In the first channel (CH1), all the nodes that observed 1 within the group U will broadcast their feedback simultaneously, indicating that there is at least one sensor within the group that observed the symbol 1; otherwise, they will all remain silent. Similarly, all nodes that observed 0 will respond in channel 2 (CH2). If the observations of these sensors are identical, a feedback of 0 or 1, as shown in FIG. 8, will be received specifying the symbol that was observed by all the sensors within the group, thus, resolving the content of these sensors. However, if the observations of the sensors consist of different values, the feedback will result in an erasure (i.e. the e feedback shown in FIG. 8) and a subgroup of the sensors will be required to retransmit in the following time slot.

The signaling on the two orthogonal channels can be constructed through the cooperative transmission of the sensors. Two possible embodiments are: (1) the direct transmission protocol as in the first embodiment of the method of these teachings; and (2) the cooperative relaying protocol as in the preceding embodiment of the method of these teachings.

In the first case, each sensor within the tested group transmits directly to all receivers through the wireless broadcast medium, i.e. for $s_j$ in the tested group U, a signal $$a_j(t) = X_j p_1(t) + \overline{X}_j p_2(t)$$

is transmitted according to the observation $X_j$ and its complement $\overline{X}_j$, where $p_1(t)$ and $p_2(t)$ represent the orthogonal waveforms corresponding to the two channels. In this case, the sensor $s_t \in S$ receives the mixture of signals emitted directly from the sensors in U. At the receiver end, an energy detector is implemented on both channels. The outputs (0,1), (1,0) and (1,1) provides the receiver with the 0, 1, e feedback shown in FIG. 8.

In the direct transmission strategy, it is necessary for the sensors to transmit with a sufficiently large power in order to achieve a reliable reception, which limits the application to sensors located in a small area. Hence, a relaying form of information delivery would clearly provide an advantage over the direct transmission strategy. However, the multi-hop broadcasting protocols derived for packet networks do not scale well in a large scale sensor application. Furthermore, it is particularly important to avoid the heavy duty networking and MAC protocols used in packet networks since the feedback is on a symbol-by-symbol basis. An embodiment that meets these needs is a symbol-by-symbol physical layer broadcasting scheme based on what the Opportunistic Large Array (OLA) described in US patent Application Publication No. 2005/0113084 (for U.S. patent application Ser. No. 10/946,439), which is incorporated by reference herein, in U.S. Provisional Patent Application Ser. No. 60/504,845, also incorporated by reference herein, and in Anna Scaglione and Yao-Win Hong, Opportunistic large arrays: cooperative transmission in wireless multihop ad hoc networks to reach far distances, IEEE Transactions on Signal Processing, Vol. 51, No. 8, August 2003, pp. 2082-2092, also incorporated by reference herein.

Let U be the group of sensors tested in the present transmission period and let $U0 \equiv \{si \in U: Xi=0\} \subset U$. Similarly, let $U1 \equiv \{si \in U: Xi=1\}$. The transmission is initiated by having each sensor $Si \in U$ transmit a signal as in the above embodiment. In this case, the group of sensors U1 will serve as the leaders of the cooperative broadcast in channel CH1 while the sensors in group U0 are leaders in channel CH2. Each cooperative broadcasting is operated independently in the two channels as described below. The aggregate signal is received in CH2 after the transmission of the leaders U0, i.e. for receiver $si \in S-U0$. Based on the received signal, each receiver performs a Neyman-Pearson detection to determine the presence or absence of a transmitted pulse. At this point, the performance of the system is equivalent to the direct transmission scheme. However, instead of determining the feedback information based on the present decision, each sensor that detected the presence of a pulse relays the information by retransmitting the same pulse.

The retransmission of the relaying nodes will then increase the energy of the received signal at the nodes that have not yet detected the pulse. In this case, the signal received from the source is negligible compared to the relaying signals and the newly informed sensors form a second layer of relay. Continuing in this fashion, the retransmission of the relaying nodes will cause an avalanche of signaling that will spread the feedback throughout the entire network (given that the power of the transmission or the density of the sensors are sufficiently large).

For a sufficiently dense network and a properly chosen detection threshold, the broadcast signal can be received reliably at all nodes within the network. Instead, if no pulse is detected by any of the receiving sensors, it is assumed that $U_0$ is an empty set and the test will proceed on a subsequently chosen group. The aggregate signal strength of both the sources and the relays provide the receiver with a reliable detection of the feedback information while maintaining the low latency of a symbol-based transmission system. Certainly, one may adjust the group testing strategy for different channel models and incorporate other detection and estimation strategies coupled with optimized transmission.

Figure 9A:
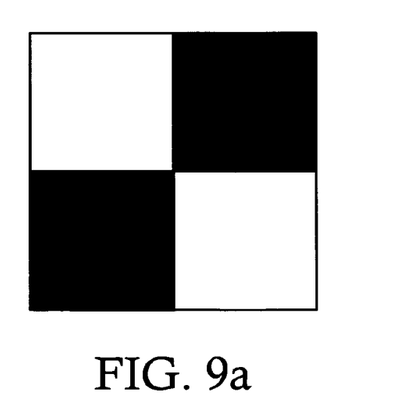
FIGS. 9a and 9b are schematic graphical representation of the field observed by a sensor network of these teachings.
Figure 9B:
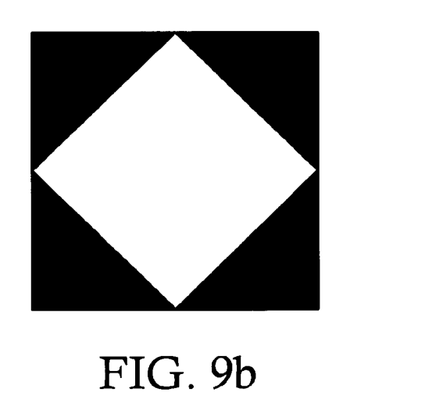
Figure 10A:
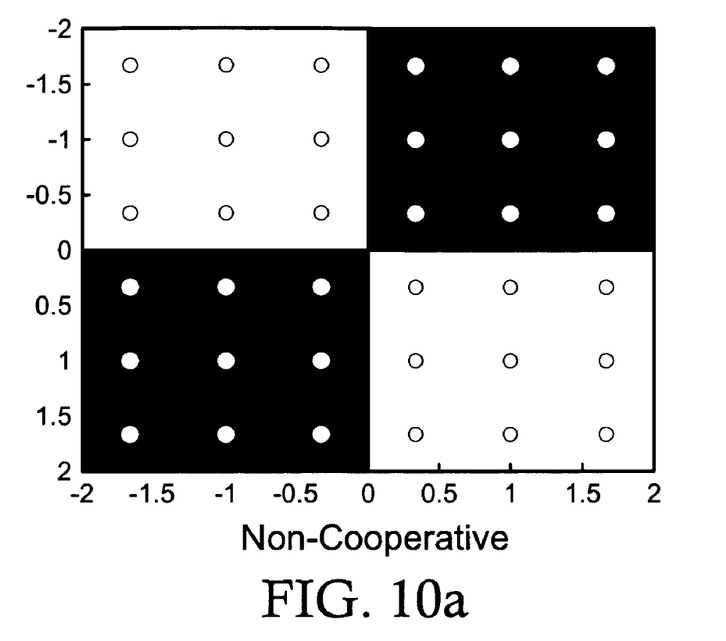
Figure 10B:
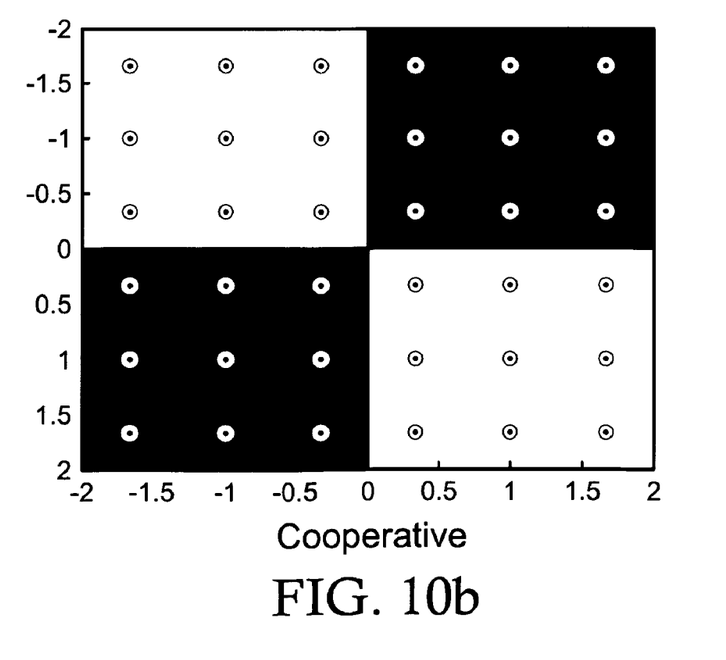
Figure 11A:
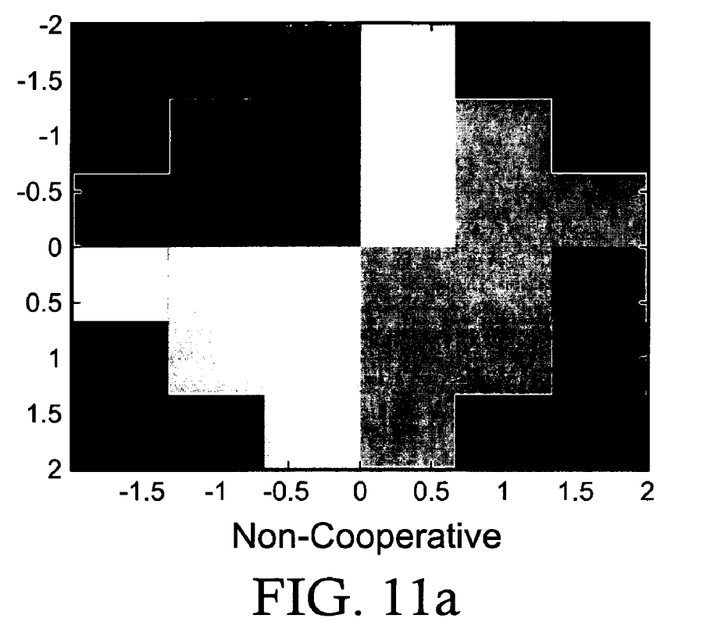
FIGS. 11a and 11b are schematic graphical representation of the output (response) from sensor networks of these teachings for the field of FIG. 9b.
Figure 11B:
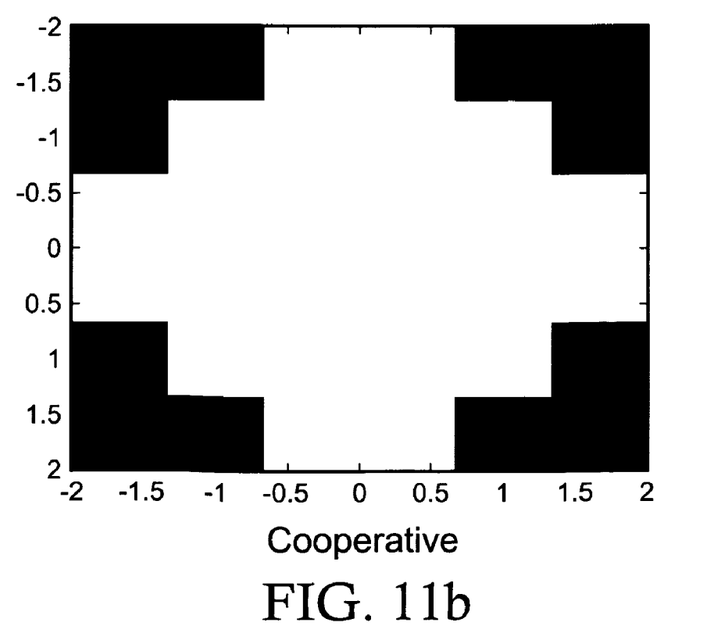
Figure 12:
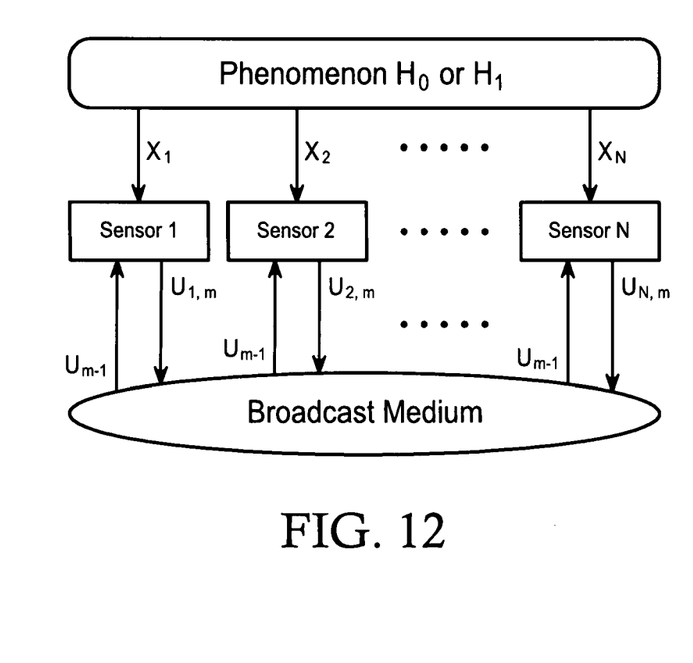
FIG. 12 is another schematic graphical representation of an embodiment of the system of these teachings.

Consider the case where N sensors are distributed in a regular grid within a d×d square area. In the exemplary embodiment presented below, two examples of the binary field are considered as shown in FIGS. 9a, 9b, where each sensor observes the local binary information according to the illustrated figures. The field described in FIG. 9(a) is ideal for the location-based splitting as defined above since the partitioning of the area is consistent with the realization of the sensor field. In this case, the number of tests necessary to resolve the field is equal to 7. However, the field illustrated in FIG. 9(b) requires a much higher number tests which depends on the distribution of the sensors. In the first experiment, we look at a network of N=36 sensors where the sensors are distributed in a 6-by-6 regular grid as shown in FIGS. 10, 10b. Let each sensor observe its local information according to the image shown in FIG. 9(a). In FIGS. 11a, 11b, we show the performance of the non-cooperative and cooperative transmission schemes using the receiver model specified hereinabove. The channel coefficients, $h_{ij}$ for all i and j, are assumed to be independent Rayleigh coefficients with variance 1, which are randomly determined for each trial but fixed over different experiments. In this simulation, the noise variance is set to No=0.002 and the detection threshold is set to $\tau$=0.01. Through the sequence of feedbacks, each sensor will have a local reconstruction of the sensor field degraded by the channel errors. In FIGS. 11a and 11b, the reconstruction, with no error detection, is illustrated in a gray scale image with each block representing the average reconstruction over all sensors and over 10 different sets of channel coefficients. While both schemes perform relatively well, the cooperative case is slightly better than the non-cooperative case. The average number of tests required for the cooperative scheme is 9 while 11 are required for the non-cooperative scheme, indicating a higher error probability in the latter case. However, if a larger number of tests are required for the detected image, as it is for FIG. 9(b), a significant difference may be observed between the two schemes due to the error propagation that results from the sequential selection of group tests. This effect is shown in FIG. 11b for No=0.001, which shows that the cooperative scheme provides us with a much more reliable transmission channel than the non-cooperative scheme.

In group testing protocols, the control and feedback information required to effectively schedule the collective transmission of sensor observations are defined. In this case, the error in the received feedback causes erroneous state transitions within the group testing process and it propagates over the subsequent tests. To overcome this effect, two standard methods can be applied for error control: (1) Error Detection with Retransmission Request; and (2) Forward Error Correction Coding. In the error detection scheme, an error detection bit is imposed after every m feedback transmissions and repeat the corresponding sequence of group tests whenever an error is detected. In the second case, error correction codes are imposed upon every block of feedbacks to implement forward error correction. A plausible approach is to design a code that is able to correct the earliest error within the block. Assuming that the subsequent feedbacks are not in error, one can recover from the erroneous state transitions that may occur due to sequential structure of the group tests. Even when an ambiguity occurs in the subsequent sequence of feedbacks, a maximum likelihood decoder can be implemented to obtain the optimal reconstruction, much like the well-known Viterbi decoder.

In a further embodiment of the method of these teachings, the method of these teachings can be applied to the efficient exchange of messages required for data fusion. Consider the binary hypothesis testing problem for a network of N sensors $S=\{s_1, \ldots, s_N\}$ and let $X=[X_1, \ldots, X_N]$ be the set of observations where the random variable $X_i$ represents the observation made by sensor si, and that the observations are mutually independent conditioned on the hypothesis. Initially, each sensor makes a local binary decision for the hypothesis testing problem:

$$H_0: X_i \leq f_{0,i}$$

$$H_1: X_i \leq f_{1,i}$$

For distributed sensor embodiments, where each distributed source (sensor) in the selected group acts also as a receiver, the method of these teachings for efficient exchange of messages required for data fusion includes the following additional steps (shown together with the steps previously described):

(a0) determine a conditional probability of obtaining decision $u_m$ after $u0, u1, \ldots, u_{m-1}$ have occurred, (a) Selecting a transmission action or test that includes:
(a1) selecting a group of the distributed sources, (a2) selecting a coding rule applied by each member in the group. The coding rule is based on the node local data and possibly on the current step of the algorithm (b) receiving, at a receiving node, the transmitted codes from the selected group of the distributed sources. (In one embodiment, each distributed sensor/source acts as a receiver/transmitter.) The codes can be received individually or in a combined form due to the presence of a Multiple Access Channel between the receiver and the group of nodes. The type of channel affects the design of the coding rule. (b1) Repeat (b) for every node in the network.

(c) performing a predetermined processing on the data received at the receiving node using the codes acquired in this action/test and in the previous steps. (c1) Perform (c) for every node in the network. The processing provides each node with:

(d) an estimate or an inference on the data that all the sensors have. If the estimate or inference meets the predetermined criterion of performance set for the algorithm, the procedure stops otherwise (e) if the estimated data does not satisfy a predetermined criterion, repeating steps (a) through (d), wherein the estimated data is substantially the data from the number of distributed sources if the predetermined criterion is met and the estimated data is a decision $U_m$, (f) determining whether the decision converges according to a predetermined convergence criterion, (g) if the decision does not converge, repeating steps (a0) through (f).

Figure 13:
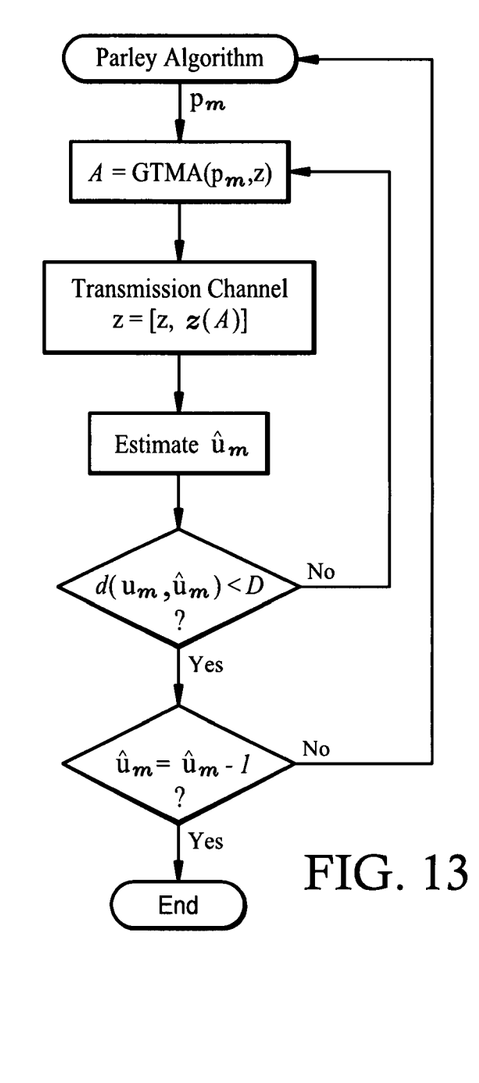
FIG. 13 is a schematic graphical representation of an embodiment of the method of these teachings.

A flow chart of the above described embodiment of the method of these teachings is shown in FIG. 13. The "parley" section includes, where each distributed sensor/source acts as a receiver/transmitter, determining an estimate or an inference on the data that all the sensors in the group have. (See P. F. Swaszek and P. Willett, "Parley as an approach to distributed detection," *IEEE Trans. Aerosp. Electron. Syst.*, vol. 31, no. 1, pp. 447-457, January 1995, incorporated by reference herein.)

In one embodiment the method of these teachings includes:
a0) determining a conditional probability of obtaining an outcome if prior outcomes have been reached;

selecting a group of the distributed sensors, and selecting a coding rule applied by each member of the group of the distributed sources;

(b) receiving, at each node, transmission from the selected group of the distributed sources, wherein the received transmission comprises received transmitted codes, (c) performing a predetermined processing on the data received at the receiving node, obtaining, from the predetermined processing, an estimate of the data from the number of distributed sources, determining if the estimate satisfies a predetermined criterion;

repeating steps (a) through (d), if the estimate does not satisfy a predetermined criterion;

selecting the estimate, if the estimate satisfies the predetermined criterion, wherein the estimate is substantially the data from the group of distributed sensors if the predetermined criterion is met;

evaluating a predetermined expression;

based on the evaluated predetermined expression, determining a second group of distributed sensors that are scheduled to transmit and determining a predicted hypothesis that is used as a guess of the sensors' data outcome;

obtain an estimate of the data outcome;

repeating steps (a0) through (k), if the estimate of the data outcome does not satisfy another predetermined criterion, determining a difference between the estimate of the data outcome to a previous estimate of the data outcome, if the estimate satisfies the another predetermined criterion;

if the difference is more than a convergence criterion, repeating steps (a0) through (m); and obtaining a data outcome, if the difference is less than or equal to the convergence criterion.

Details of the data fusion applications of these teachings are given in Hong Y. W., Scaglione A., Varshney P. K., "Data-Driven Communications for Consensus Decision-Making in Wireless Sensor Networks," Appendix II of U.S. Provisional Application 60/721,314, which is incorporated by reference herein.

As previously described herein above, a single channel is assigned to a group of sensors that have a highly predictable set of messages to transmit, as opposed to assigning a channel to each individual sensor in the conventional case. The guesses or tests imposed on the sensors during each channel access serves as a querying strategy that schedules the transmissions and the response that is emitted from the sensors. The response to each query (or guess) will serve as a successive refinement for the messages at each sensor, which will eventually allow the sensors to pinpoint the true value of X. The process continues until the messages at all nodes are resolved.

For the m-th round of message exchange, this embodiment of the method of these teachings specifies a guess or a query on a subset of messages $U \subset \tilde{U} = \{u_{1,m}, \ldots, u_{N,m}\}$ during each channel access and the sensors corresponding to these messages will respond collectively through the cooperative transmission channel. The output of the channel during the l-th channel access of the m-th iteration is denoted by $Z_{(m)l}$. The sequence of outputs $Z_{(m)} = [Z_{(m)0}, \ldots, Z_{(m)L(m)-1}]$ will constitute a data representation of the message $u_m$, where $L_{(m)}$ is a random variable depending on the realizations of $u_m$, i.e. variable length encoding. If the queries take into account the statistics of the data, this embodiment of the method of these teachings can achieve compression gains in the data representation $Z_{(m)}$ and, thus, reducing the number of channel accesses. For brevity of notation, the superscript m is omitted in the following derivations.

During each channel access, the guess or query is that a group of messages $U \subset \tilde{U}$ all take the same value b, where $b \in \{0, 1\}$ represents the most probable hypothesis. Consider the case where each sensor $s_i$ that corresponds to a message in U, i.e. $U_{i,m} \in U$, will respond with a logical 1 if $u_i \neq b$, and it will respond with a logical 0 if $u_{i,m} = b$. The aggregate output Z will be equal to the logical OR of the responses, i.e. the output of the channel is $$Z = \vee_{u_{i,m} \in U} \{u_{i,m} \neq b\}.$$

This is referred to as the noiseless OR channel. With this specific channel, one can infer that $u_{i,m} = b$ for all $u_{i,m} \in U$ if and only if $Z = 0$; otherwise, the realization of the messages in the set U are not resolved through the query and a smaller subset of U should be chosen for the subsequent transmissions.

During the m-th round of the method shown in FIG. 13, a set of messages $u_m$ is generated at each node and the probability $p_m$ can be deduced from the previous rounds of information exchange. Based on the probabilities $p_m$, the method determines an action A that specifies the group of sensors U that are scheduled to transmit and determines the predicted hypothesis b that is used as a guess of the sensors' realizations. In other words, the strategy first computes the optimal detection b based on the local decisions exchanged in the previous rounds. Then a group U is chosen and tested through the binary OR. The new channel output will be appended to the previous sequence of outputs and a new estimate of $u_m$ is obtained. The inner loop of the method continues until the estimate $\hat{u}_m$ falls within the distortion D and the process is terminated when the decisions converge.

$Z_0^{l-1}=[Z_0, \ldots, Z_{l-1}]$ represents the output of the channel determined up to the (l-1)-th transmission, and $z_0^{l-1}=[z_0, \ldots, z_{l-1}]$ represents the realization of $Z_0^{l-1}$. In one embodiment, the maximum entropy criterion is used to generate the action that is output from the function GTMA($p_m$, z), shown in FIG. 13. In general, the action can be an arbitrary function of the local observations X. However, in the above embodiment, the action corresponds to the group of sensors U that is tested during the channel access and the estimate of the underlying hypothesis $H_b$. Given a certain realization of X, the values of U and b determine the scheduling of the sensors and the output of the cooperative channel access.

In one embodiment, the maximum entropy criterion is utilized to derive the action A for each of the channel accesses in the decentralized detection scenario. Specifically, the action A is chosen such that the channel output contains the maximum entropy, i.e. the action of the l-th channel access is $$A_l = \mathrm{argmax}_A H(Z_l(A)|Z_0^{l-1}=z_0^{l-1}).$$

In other words, the action selected above yields the most unpredictable output from the cooperative channel. For each outer loop of the method shown in FIG. 13, the message exchanges are initiated with the action Ao which is derived with the conditional probability. (For further detailed description, see Hong Y. W., Scaglione A., Varshney P. K., "Data-Driven Communications for Consensus Decision-Making in Wireless Sensor Networks," Appendix II of U.S. Provisional Application 60/721,314, which is incorporated by reference herein.)

While the embodiment related to a noiseless OR channel, it should be noted that the present invention is not limited only to that channel. As stated above, if $A_l$ be the action taken during the l-th test, and for a wireless sensor network with N sensors $S=\{s_0, \ldots, s_{N-1}\}$ and the set of observations $X=[X_0, \ldots, X_{N-1}]$ where $X_i$ is the random variable representing the observation made at sensor $s_i$, a testing strategy determines a sequence of actions (or tests) $A_0, A_1, \ldots, A_{L-1}$ that is performed on X. A data representation of the observations X is formed by the sequence of test outcomes (or cooperative channel outputs) $Z_0, Z_1, \ldots, Z_{L-1}$, where $Z_l$ is the outcome of the action $A_l$ as shown in FIG. 1(b).

I(X; Y) represents the mutual information between the random variables X and Y. In some of the embodiments, in order to maximize the upper bound, it is desirable to select the action for each channel access to maximize the normalized mutual information defined as $$G(X; \bar{Z}_k|\bar{Z}_0^{k-1}) = \frac{I(X; \bar{Z}_k|\bar{Z}_0^{k-1})}{p(d(X, \hat{X}_{k-1}) > D)}.$$

In one instance, the action $A_k$ for the k-th test is taken to be that action that maximizes the normalized mutual information evaluated at the previous iteration, that is, where $$\bar{Z}_0^{k-1}=z_0^{k-1}.$$

A more detailed description can be found in Hong Y. W., Scaglione A., Varshney P. K., "Information Theoretic Approach for Data-Driven Communications in Sensor Networks," Appendix III of U.S. Provisional Application 60/721,314, which is by reference incorporated herein.

Figure 14A:
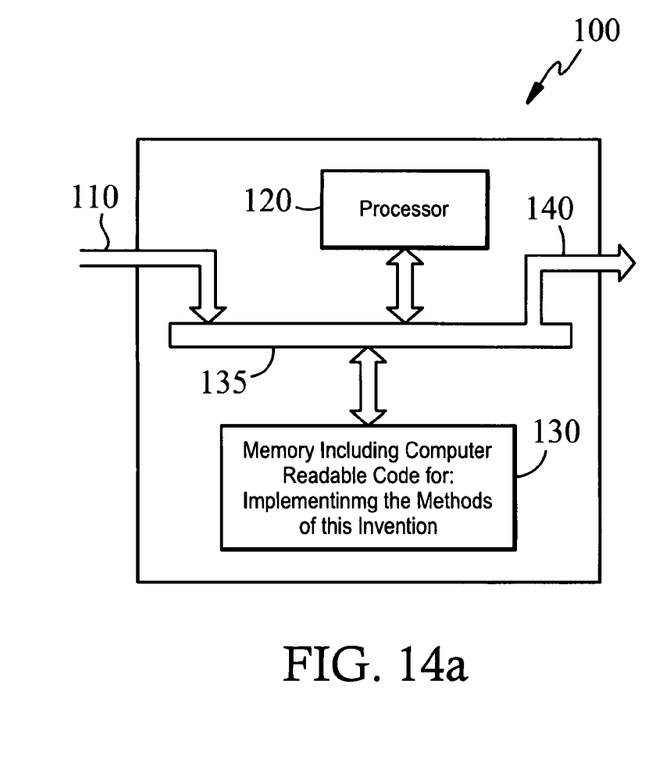
FIGS. 14a, 14b and 14c represent schematic block diagram representations of an embodiment of the system of these teachings.

One embodiment 100 of a receiver at a receiving node of these teachings is shown in FIG. 14a. Referring to FIG. 14a, a received signal 110 is provided, in digital form, from the receiver to a processor 120. The processor 120 can comprise one or many processing units. A computer usable medium 130 that has computer readable code embodied therein for applying the methods of these teachings to receive and, in some embodiments, decide whether to retransmit the received information. In one embodiment, the computer readable code causes the processor 120 to determine whether to retransmit the received information and to generate an enabling or disabling signal 140 which is provided to the transmitter 55. The processor 120 and the computer usable medium 130 are operatively connected through interconnection means 135 (such as, but not limited to, a bus). It should be noted that equivalently, the same functions shown in FIG. 16a could be accomplished by application specific or field programmable components.

Figure 14B:
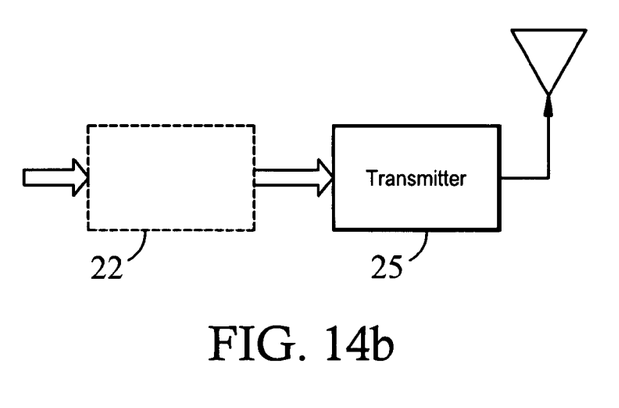
Figure 14C:
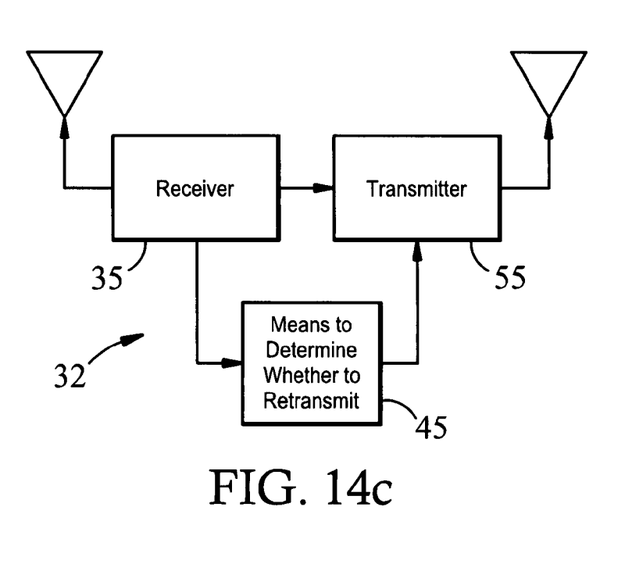

In one embodiment of the system of these teachings, a source (transmitting) node 22, shown schematically in FIG. 14b, includes a transmitter 25 (a transmitter as used herein may include a transmitting component such as, but not limited to, an antenna). Each receiving node 32, one of which is shown schematically in FIG. 14c, includes a receiver 35 (a receiver as used herein may include a receiving component or sensor such as, but not limited to, an antenna), means for applying a predetermined retransmission criterion (such as computing means) 45, and a transmitter 55. In one embodiment the receiver, means 45 for applying a predetermined retransmission criterion, and the transmitter could be integrated in one system, hereinafter referred to as a transceiver.

Elements and components described herein may be further divided into additional components or joined together to form fewer components for performing the same functions.

Each computer program within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable or usable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, a carrier wave, or any other medium from which a computer can read.

Although the teachings has been described with respect to various embodiments, it should be realized these teachings is also capable of a wide variety of further and other embodiments within the spirit and scope of the appended claims.

What is claimed is:

1. A method for obtaining data from a number of distributed sources, the method comprising the steps of:
   (a) selecting, utilizing at least one processor and computer usable memory that causes the at least one processor to perform the method, a group of the distributed sources; the group being less the number of distributed sources;
   (b) receiving, at a receiving node, transmission from the selected group of the distributed sources;
   (b1) performing, utilizing at least one processor and com memory that causes the at least one processor to perform the method, tests on the group of the distributed sources; the performing tests on the group of distributed sources comprising the steps of:
   i) dividing the group of the distributed sources into two subgroups;
   ii) testing each subgroup with tests restricted to a predetermined class; said tests having outcomes; said outcomes belonging to another predetermined class;
   repeating steps i) and ii) each subgroup, if outcomes of the tests result in an equal predetermined outcome, a subgroup having said equal predetermined outcome constituting an undetermined subgroup;
   repeating steps i) and ii) for a smallest undetermined subgroup, if one of the outcomes of the tests is an outcome from a predetermined set from said another predetermined class;
   (c) performing a predetermined processing on the data received at the receiving node;
   said predetermined processing utilizing results of the performed tests;
   (d) obtaining, from the predetermined processing, an estimate of the data from the number of distributed sources;
   (e) determining if the estimate satisfies a predetermined criterion;
   (f) repeating steps (a) through (d), if the estimate does not satisfy a predetermined criterion;
   (g) selecting the estimate, if the estimate satisfies the predetermined criterion.

2. The method of claim 1 further comprising the step of:
   selecting a coding rule applied by each member of the group of the distributed sources;
   and wherein the received transmission comprises received transmitted codes.

3. The method of claim 1 wherein the step of obtaining an estimate further comprises the step of utilizing a mean square error criterion.

4. The method of claim 1 wherein the step of determining the estimate satisfies the predetermined criterion comprises the steps of:
   obtaining a distortion measure from the estimated data; and
   determining whether the distortion measure is less than or equal to a predetermined distortion constraint.

5. The method of claim 1 wherein the two subgroups are of equal size.

6. The method of claim 1 wherein the two subgroups are of unequal size.

7. The method of claim 6 wherein the dividing of the groups is performed according to the location of the distributed sources.

8. The method of claim 1 further comprising the step of
   partitioning the number of distributed sources into a predetermined number of groups; and
   performing steps a) through g) on each group from the predetermined number of groups.

9. The method of claim 8 wherein the number of distributed sources is selected according to a predetermined criterion.

10. A computer implemented method for obtaining data from a number of distributed sources, the method comprising the steps of:
    (a0) prior to step (a), determining, utilizing at least one processor and computer usable memory that causes the at least one processor to perform the method., a conditional probability of obtaining an outcome if prior outcomes have been reached in a prior measurement;
    (a) selecting, utilizing the at least one processor and computer usable memory that causes the at least one processor to perform the method, a group of the distributed sources; the group being less the number of distributed sources;
    (a1) selecting, utilizing the at least one processor and computer usable memory that causes the at least one processor to perform the method, a coding rule applied by each member of the group of the distributed sources;
    (b) receiving, at a receiving node, transmission from the selected group of the distributed sources; the received transmission comprising received transmitted codes;
    (c) performing a predetermined processing on the data received at the receiving node;
    said predetermined processing utilizing results of the performed tests;
    (d) obtaining, from the predetermined processing and utilizing the at least one processor and computer usable memory that causes the at least one processor to perform the method, an estimate of the data from the number of distributed sources;
    (e) determining, utilizing the at least one processor and computer usable memory that causes the at least one processor to perform the method, if the estimate satisfies a predetermined criterion;
    wherein each distributed sensor acts as a receiver/transmitter; and,
    wherein steps (b), (c), (d) and (e) are repeated at each sensor from the group of distributed sensors;
    (f) repeating steps (a) through (d), if the estimate does not satisfy a predetermined criterion; and
    (g) selecting the estimate, if the estimate satisfies the predetermined criterion wherein the distributed sources comprise distributed sensors;
    wherein the estimate is substantially data from the group of distributed sources if the predetermined criterion is met;
    (h) evaluating utilizing the at least one processor and computer usable memory that causes the at least one processor to perform the method, a predetermined expression;
    (i) based on the evaluated predetermined expression, determining another group of distributed sensors that are scheduled to transmit and determining a predicted hypothesis that is used as a guess of said another group of distributed sensors' data outcome;
    (j) obtain an estimate of the data outcome;
    (k) repeating steps (a0) through (k), if the estimate of the data outcome does not satisfy another predetermined criterion, (l) determining, utilizing the at least one processor and computer usable memory that causes the at least one processor to perform the method, a difference between the estimate of the data outcome to a previous estimate of the data outcome, if the estimate satisfies the another predetermined criterion;

(m) if the difference is more than a convergence criterion, repeating steps (a0) through (m); and (n) obtaining a data outcome, if the difference is less than or equal to the convergence criterion.

11. The method of claim 10 wherein a maximum entropy criterion is utilized in determining the predetermined expression.

12. The method of claim 10 wherein the predetermined expression maximizes a normalized mutual information function.

13. The method of claim 10 wherein the group of sensors selected has a substantially predictable set of messages to transmit and a single channel is assigned to the group of sensors; and wherein the predetermined processing schedules transmissions and response that is emitted from the sensors in the group of sensors.

14. The method of claim 13 wherein the predetermined processing takes into account the statistics of the data; and wherein compression gains are achieved in data representation.

15. A system for sensing information, the system comprising:
   at least one receiving node; and
   a plurality of sensing nodes, each one node from said plurality of receiving nodes comprising:
      a sensor; and
      a transmitter;
   each node from said plurality of sensing nodes being capable of transmitting information sensed;
   said at least one receiving node comprising:
      a receiver;
      at least one processor;
      at least one non-transitory computer usable medium having computer readable code embodied therein, said computer readable code being capable of causing said at least one processor to:
         (a) select a group of the sensing nodes, said group being less said plurality of sensing nodes;
         (b) receive transmission from the selected group of the sensing nodes,
         (b1) perform tests on the group of the sensing nodes; said performing tests causing said at least one processor to:
            i) divide the group of the sensing nodes into two subgroups;
            ii) test each subgroup with tests restricted to a predetermined class;
            said tests having outcomes belonging to another predetermined class;
            repeat steps i) and ii) each subgroup, if outcomes of the tests result in an equal predetermined outcome, a subgroup having said equal predetermined outcome constituting an undetermined subgroup;
            repeat steps i) and ii) for a smallest undetermined subgroup, if one of the outcomes of the tests is an outcome from a predetermined set from said another predetermined class;
         (c) perform a predetermined processing on the data received, said predetermined processing utilizing results of the performed tests;
         (d) obtain, from the predetermined processing, an estimate on the data from the plurality of sensing nodes,
         (e) determining if the estimate satisfies a predetermined criterion;
         (f) repeating steps (a) through (d), if the estimate does not satisfy a predetermined criterion,
         (g) selecting the estimate, if the estimate satisfies the predetermined criterion.

16. A network for sensing information, the network comprising:
   a plurality of sensing nodes, each one node from said plurality of sensing nodes comprising:
      a receiver;
      at least one processor;
      at least one non-transitory computer usable medium having computer readable code embodied therein, said computer readable code being capable of causing said at least one processor to:
         (a0) prior to step (a), determining a conditional probability of obtaining an outcome if prior outcomes have been reached in a prior measurement;
         (a) select a group of sensing nodes from said plurality of sensing nodes, said group being less said plurality of sensing nodes;
         (b) selecting a coding rule applied by each member of said group of the sensing nodes,
         (c) receive transmitted codes from said group of sensing nodes,
         (d) perform a predetermined processing on the data received,
         (e) obtain, from the predetermined processing, an estimate on the data from the plurality of sensing nodes,
         (f) determining if the estimate satisfies a predetermined criterion;
         (g) repeating steps (a) through (f), if the estimate does not satisfy a predetermined criterion,
         (h) selecting the estimate, if the estimate satisfies the predetermined criterion;
         (i) evaluating a predetermined expression;
         (j) based on the evaluated predetermined expression, determining another group of distributed sensors that are scheduled to transmit and utilizing a predicted hypothesis as a guess of said another group of distributed sensors' data outcome;
         (k) obtain an estimate of the data outcome;
         (l) repeating steps (a0) through (k), if the estimate of the data outcome does not satisfy another predetermined criterion,
         (m) determining a difference between the estimate of the decision to a previous estimate of the data outcome, if the estimate satisfies the another predetermined criterion;
         (n) if the difference is more than a convergence criterion, repeating steps (a0) through (m);
         (o) obtaining a data outcome, if the difference is less than or equal to the convergence criterion and
      a transmitter;
   each node from said plurality of sensing nodes being capable of retransmitting information received from at least one of said group of sensing nodes and information received from other nodes from said plurality of sensing nodes.

17. The network of claim 16 wherein a maximum entropy criterion is utilized in determining the predetermined expression.

18. The network of claim 16 wherein the predetermined expression maximizes a normalized mutual information function.

* * * * *

UNITED STATES PATENT AND TRADEMARK OFFICE
CERTIFICATE OF CORRECTION

PATENT NO.         : 7,929,411 B2
APPLICATION NO.    : 11/529084
DATED              : April 19, 2011
INVENTOR(S)        : Anna Scaglione et al.

It is certified that error appears in the above-identified patent and that said Letters Patent is hereby corrected as shown below:

In column 15, line 16 (claim 1), "less the number" should read -- less than the number --
In column 15, line 20 (claim 1), "com" should read -- computer usable --
In column 15, line 30 (claim 1), "each subgroup" should read -- for each subgroup --
In column 15, line 16 (claim 10), "perform the method.," should read -- perform the method, --
In column 16, line 23 (claim 10), "less the number" should read -- less than the number --
In column 17, line 42 (claim 15), "less said plurality" should read -- less than said plurality --
In column 17, line 53 (claim 15), "each subgroup" should read -- for each subgroup --
In column 18, line 20 (claim 16), "less said plurality" should read -- less than said plurality --

Signed and Sealed this
Twenty-eighth Day of June, 2011

David J. Kappos
*Director of the United States Patent and Trademark Office*